(12) United States Patent
Park et al.

(10) Patent No.: US 9,052,421 B2
(45) Date of Patent: Jun. 9, 2015

(54) BACKLIGHT UNIT FOR DISPLAY DEVICE AND DRIVING METHOD THEREOF

(71) Applicant: Samsung Display Co., Ltd., Yongin, Gyeonggi-Do (KR)

(72) Inventors: Young-Min Park, Hwaseong-si (KR); Kyung-Min Kim, Hwaseong-si (KR); Young Chun Kim, Seoul (KR); Jung Hoon Shin, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 214 days.

(21) Appl. No.: 13/760,628

(22) Filed: Feb. 6, 2013

(65) Prior Publication Data

US 2014/0104541 A1   Apr. 17, 2014

(30) Foreign Application Priority Data

Oct. 15, 2012   (KR) .................. 10-2012-0114225

(51) Int. Cl.
*F21V 8/00* (2006.01)
*G02F 1/13* (2006.01)

(52) U.S. Cl.
CPC .............. *G02B 6/003* (2013.01); *G02B 6/0023* (2013.01); *G02F 1/13* (2013.01)

(58) Field of Classification Search
CPC .... G02B 6/003; G02B 6/0053; G02B 6/0016; G02B 6/0073; G02B 6/0018; G02B 6/00; G02B 6/0028; G02B 6/0046; G02B 19/0014; G02B 3/0062; G02F 1/133603; G02F 1/133615; G02F 1/133606; G02F 1/133611; G02F 1/1335; G02F 1/1336; G02F 1/133524; G02F 2001/133607; G02F 1/13; G02F 1/133504; F21V 5/04

USPC ........ 362/97.1, 607, 608, 611, 613, 602, 621, 362/97.2, 97.3, 610, 612, 335, 355, 558, 362/615; 349/65, 62, 61, 95, 187; 359/599
See application file for complete search history.

(56) References Cited

U.S. PATENT DOCUMENTS

| | | | |
|---|---|---|---|
| 7,540,643 B2 | 6/2009 | Hu et al. | |
| 7,626,643 B2 | 12/2009 | Ijzerman et al. | |
| 7,710,648 B2 | 5/2010 | Chestak et al. | |
| 8,421,956 B2 * | 4/2013 | Lee et al. | ........................ 349/62 |
| 2004/0130880 A1 * | 7/2004 | Min et al. | ........................ 362/31 |
| 2007/0195409 A1 * | 8/2007 | Yun et al. | ....................... 359/462 |
| 2007/0200792 A1 | 8/2007 | Kim et al. | |
| 2009/0185395 A1 * | 7/2009 | Hung et al. | ................... 362/618 |

FOREIGN PATENT DOCUMENTS

| | | |
|---|---|---|
| JP | 3922735 B2 | 3/2007 |
| JP | 4164077 B2 | 8/2008 |
| KR | 10-0634964 B1 | 10/2006 |
| KR | 1020070002617 A | 1/2007 |
| KR | 1020080056602 A | 6/2008 |
| KR | 1020080105572 A | 12/2008 |
| KR | 1020090047933 A | 5/2009 |

* cited by examiner

*Primary Examiner* — Thoi Duong
(74) *Attorney, Agent, or Firm* — Cantor Colburn LLP

(57) ABSTRACT

A backlight unit for a display device includes a light source module which emits light, a light guiding plate which guides the light incident from the light source module toward a front surface thereof, and a light beam spread angle regulating sheet disposed between the light source module and a lateral surface of the light guiding plate, where the light beam spread angle regulating sheet regulates a light beam spread angle of the light incident from the light source module.

20 Claims, 11 Drawing Sheets

BACKLIGHT UNIT FOR DISPLAY DEVICE AND DRIVING METHOD THEREOF

This application claims priority to Korean Patent Application No. 10-2012-0114225, filed on Oct. 15, 2012, and all the benefits accruing therefrom under 35 U.S.C. §119, the content of which in its entirety is herein incorporated by reference.

BACKGROUND (a) Field

Exemplary embodiments of the invention relate to a backlight unit for a display device and a driving method thereof, and particularly, to a backlight unit for a display device, in which a light beam spread angle is effectively regulated, and a driving method thereof.

(b) Description of the Related Art

Generally, a display device includes a plurality of pixels for displaying an image, a display panel on which a signal line for transferring a driving signal to a pixel is provided, and a driver that generates a driving signal for driving the pixels.

The display panel includes a display region, which is a region for displaying an image, and a non-display region, in which the image is not displayed, and the non-display region includes a peripheral region around the display region, the pixels and signal lines may be positioned in the display region, and an end portion of the signal line may extend to the peripheral region.

The driver includes a data driver that applies a data voltage to the pixel and a gate driver that applies a gate signal for controlling the transfer of the data voltage. The gate driver and the data driver may be mounted in a chip form on a printed circuit board ("PCB"), a flexible printed circuit film or the like, for example, to be connected to the display panel, or a driver chip may be directly mounted on the display panel.

A display device may be a self-light emitting type display device that emits light by itself, such as a light emitting diode display ("LEDD"), a field emission display ("FED"), a vacuum fluorescent display ("VFD"), and a plasma display panel ("PDP"), or a light receiving type display device that does not emit light by itself but includes a light source, such as a liquid crystal display ("LCD") and an electrophoretic display.

A display device including a separate light source, or the light receiving type display device, may be a transmission type display device, and the transmission type display device may include a display panel that displays an image and a backlight unit that supplies light to the display panel. The backlight unit typically includes a light source module for emitting light, various optical sheets, and the like, for example. The light source module may include at least one light source (or called a light emitting element). The light source may be a cold cathode fluorescent lamp ("CCFL"), a flat fluorescent lamp ("FFL"), a light emitting diode ("LED"), or the like, for example. Recently, an LED, which has small power consumption and small caloric value, has been widely used as a light source.

The backlight unit may be classified into a direct type backlight unit, an edge type backlight unit, and the like according to the position of the light source module. Among the various types of the backlight unit, the edge type backlight unit adopts a method of indirectly radiating light diffused through a light guiding plate on a display panel while the light source module is provided to one side or both sides of the light guiding plate.

SUMMARY

Exemplary embodiments of the invention relate to a backlight unit for a display device in which the backlight unit may be designed without substantial limitation in a size, disposal, and the like of a light source module and a light beam spread angle is effectively regulated while a width of a peripheral region of the display device is substantially reduced.

An exemplary embodiment of the invention provides a backlight unit for a display device, the backlight unit including a light source module which emits light, a light guiding plate which guides the light incident from the light source module toward a front surface thereof, and a light beam spread angle regulating sheet disposed between the light source module and a lateral surface of the light guiding plate, where the light beam spread angle regulating sheet regulates a light beam spread angle of the light incident from the light source module.

In an exemplary embodiment, the light beam spread angle regulating sheet may include a first transparent electrode, a second transparent electrode disposed opposite to the first transparent electrode, and a lens layer disposed between the first transparent electrode and the second transparent electrode.

In an exemplary embodiment, the lens layer may include a lenticular pattern layer having a plurality of optical patterns and a first refractive index, and a liquid crystal layer including a plurality of liquid crystal molecules and having a second refractive index, which changes based on the alignment of the liquid crystal molecules.

In an exemplary embodiment, the light incident on the light beam spread angle regulating sheet may be emitted at a first light beam spread angle in a first state where a first potential difference is applied to the first transparent electrode and the second transparent electrode, and the light incident on the light beam spread angle regulating sheet may be emitted at a second light beam spread angle, which is greater than the first light beam spread angle, in a second state where a second potential difference, which is different from the first potential difference, is applied to the first transparent electrode and the second transparent electrode.

In an exemplary embodiment, the second refractive index in the first state may be greater than the second refractive index in the second state.

In an exemplary embodiment, the second refractive index in the first state may be greater than the first refractive index.

In an exemplary embodiment, each of the optical patterns may have a concave lens form, and the liquid crystal molecules may be disposed in a space confined by the optical patterns and the first transparent electrode.

In an exemplary embodiment, the backlight unit for the display device may further include: a printed circuit board on which the light source module is disposed, where the light beam spread angle regulating sheet receives a voltage from the printed circuit board.

In an exemplary embodiment, a bottom surface of the light guiding plate, which is opposite to a light emitting surface of the light guiding plate, may include an inclined surface.

In an exemplary embodiment, the light beam spread angle regulating sheet may be attached to two opposing lateral surfaces of the light guiding plate.

Another exemplary embodiment of the invention provides a driving method of a backlight unit for a display device, the method including: providing light emitted from a light source module of the backlight unit to be incident on a light beam spread angle regulating sheet of the backlight unit, applying a first potential difference to the light beam spread angle regulating sheet to set a light beam spread angle of the light incident on the light beam spread angle regulating sheet as a first spread angle, applying a second potential difference, which is different from the first potential difference, to the light beam spread angle regulating sheet to set the light beam spread angle of the light incident on the light beam spread angle regulating sheet as a second spread angle, which is different from the first spread angle, and providing the light emitted from the light beam spread angle regulating sheet to be incident on a light guiding plate of the backlight unit.

In an exemplary embodiment, the light beam spread angle regulating sheet may include the first transparent electrode, the second transparent electrode disposed opposite to the first transparent electrode, and the lens layer disposed between the first transparent electrode and the second transparent electrode.

In an exemplary embodiment, the lens layer may include the lenticular pattern layer having a plurality of optical patterns and the first refractive index, and the liquid crystal layer including a plurality of liquid crystal molecules and having the second refractive index, which changes based on alignment of the liquid crystal molecules.

In an exemplary embodiment, the second refractive index when the second potential difference is applied to the light beam spread angle regulating sheet may be less than the second refractive index when the first potential difference is applied to the light beam spread angle regulating sheet.

In an exemplary embodiment, the second refractive index when the first potential difference is applied to the light beam spread angle regulating sheet may be greater than the first refractive index.

In an exemplary embodiment, each of the applying the first potential difference to the light beam spread angle regulating sheet and the applying the second potential difference to the light beam spread angle regulating sheet may include receiving a voltage from a printed circuit board on which the light source module is mounted.

In an exemplary embodiment, the optical pattern may have the concave lens form, and the liquid crystal molecules may be disposed in a space confined by the optical pattern and the first transparent electrode.

In an exemplary embodiment, each of the applying the first potential difference to the light beam spread angle regulating sheet and the applying the second potential difference to the light beam spread angle regulating sheet may include receiving a voltage from a printed circuit board on which the light source module is disposed.

In an exemplary embodiment, a bottom surface opposite to a light emitting surface of the light guiding plate may include an inclined surface.

In an exemplary embodiment, the light beam spread angle regulating sheet may be attached to two opposing lateral surfaces of the light guiding plate.

According to exemplary embodiments of the invention, a backlight unit for a display device may be designed without limitation in a size, disposal, and the like of a light source module, and the backlight unit effectively regulates a light beam spread angle while a width of a peripheral region of the display device is substantially reduced.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
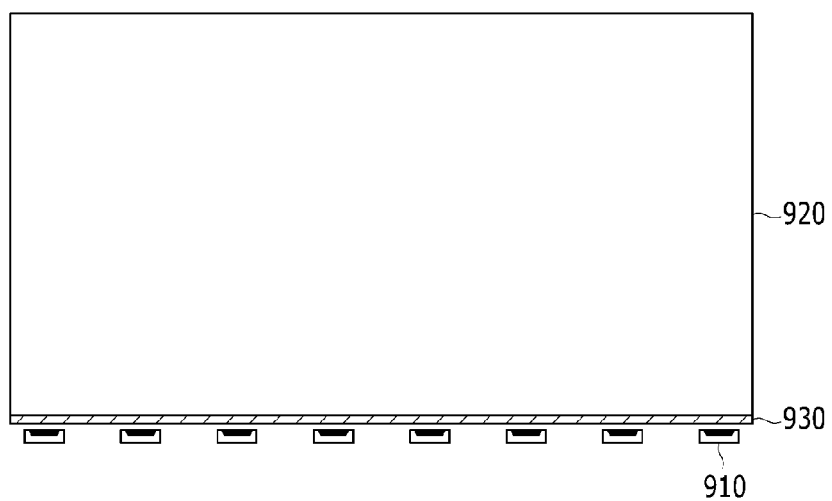
FIG. 1 is a block diagram showing an exemplary embodiment of a backlight unit for a display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a backlight unit for a display device, a display device, and a driving method thereof according to the invention will be described in detail with reference to the accompanying drawings.

First, the backlight unit for the display device according to the exemplary embodiment of the invention will be described with reference to FIGS. 1 and 2.

Figure 2:
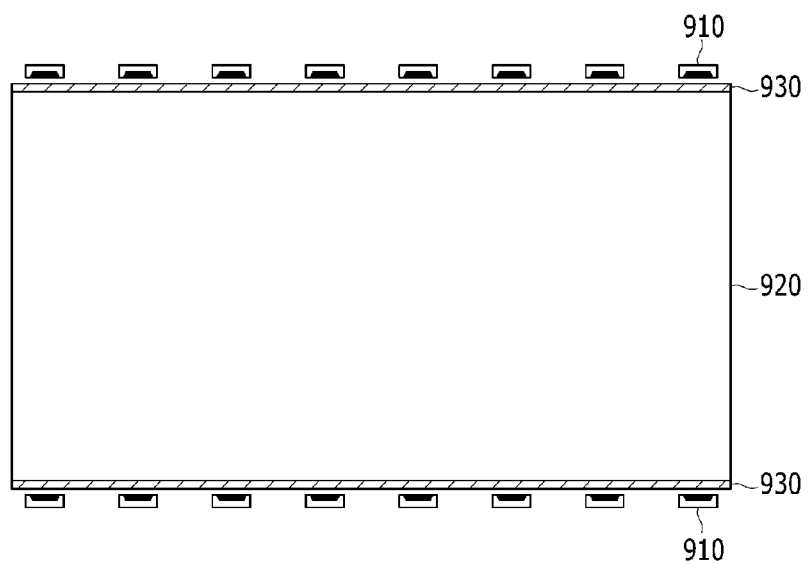
FIG. 2 is a block diagram showing an alternative exemplary embodiment of the backlight unit for the display device according to the invention.
Figure 3:
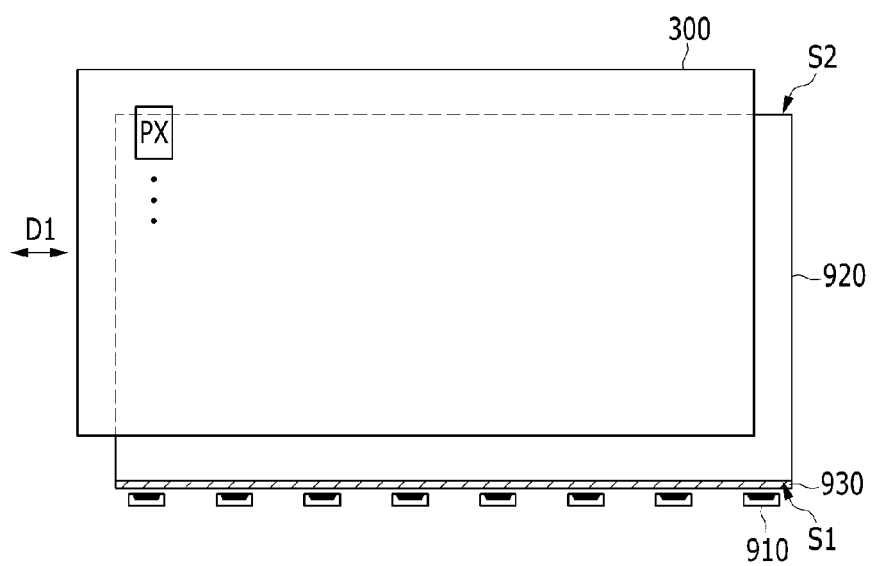
FIG. 3 is a schematic exploded perspective view of an exemplary embodiment of the display device including the backlight unit according to the invention.

FIG. 1 is a block diagram showing an exemplary embodiment of a backlight unit for a display device according to the invention, FIG. 2 is a block diagram showing an alternative exemplary embodiment of the backlight unit for the display device according to the invention, and FIG. 3 is a schematic exploded perspective view of an exemplary embodiment of the display device including the backlight unit according to the invention.

Referring to FIG. 1, an exemplary embodiment of the backlight unit for the display device includes a light source module 910 (e.g., n light source modules, where n is a natural number), a light guiding plate 920 and a light beam spread angle regulating sheet 930.

The light source module 910 may be provided in a form of light source package and includes a light emitting element. In one exemplary embodiment, for example, the light emitting element may include a light emitting diode ("LED") chip, but not being limited thereto.

The light guiding plate 920 may guide light emitted from the light source module 910 toward a front surface thereof or a display panel (not shown). Herein, a surface to which light is emitted from the light guiding plate 920 will be referred to as a front surface, and an opposite surface of the front surface will be referred to as a rear surface. In an exemplary embodiment, the light guiding plate 920 may include a material such as poly(methyl methacrylate) ("PMMA"), polycarbonates ("PC"), polyethylene terephthalate ("PET"), and the like, for example. In an exemplary embodiment, the material of the light guiding plate 920 may have a refractive index greater than 1. In one exemplary embodiment, for example, the refractive index of the material of the light guiding plate 920 may be in a range of about 1.4 to about 1.6. A bottom surface of the light guiding plate 920, e.g., the rear surface, may include an inclined surface such that incident light is reflected to and emitted from the front surface of the light guiding plate 920.

The light source module 910 may be disposed on a lateral surface of an incident light portion of the light guiding plate 920 as an edge type backlight unit. Herein, an incident light portion of the light guiding plate 920 is a portion that faces the light source module 910 to receive light, which includes a lateral surface of the light source module 910 adjacent to and facing the light source module 910, and the lateral surface of the incident light portion of the light guiding plate 920 may face another lateral surface that is different from the front surface and the rear surface of the light guiding plate 920.

In an exemplary embodiment, the light beam spread angle regulating sheet 930 is disposed between the light source module 910 and the light guiding plate 920. In one exemplary embodiment, for example, the light beam spread angle regulating sheet 930 may be attached to the lateral surface of the incident light portion of the light guiding plate 920.

In an exemplary embodiment, the light beam spread angle regulating sheet 930 regulates a spread angle of light emitted from the light source module 910 to allow light to be incident on the light guiding plate 920. In such an embodiment, the light beam spread angle regulating sheet 930 allows light to be incident on the light guiding plate 920 at two or more different light beam spread angles. In one exemplary embodiment, for example, the light beam spread angle regulating sheet 930 may inwardly refract light emitted from the light source module 910 to allow light to be incident on the light guiding plate 920 at a relatively small light beam spread angle. In such an embodiment, the light beam spread angle regulating sheet 930 may or may not outwardly refract light or may inwardly refract light in a relatively smaller degree to allow light to be incident on the light guiding plate 920 at a relatively large light beam spread angle.

An exemplary embodiment of the backlight unit according to the invention may further include at least one of a diffuser and an optical sheet, which may be disposed on the front surface of the light guiding plate 920.

In an exemplary embodiment, as shown in FIG. 1, the backlight unit may include the light source module 910 disposed on a lateral surface of one incident light portion of the light guiding plate 920. In an alternative exemplary embodiment, as shown in FIG. 2, the backlight unit may include the light source module 910 disposed on the lateral surfaces of two opposing incident light portions of the light guiding plate 920.

In the exemplary embodiment shown in FIG. 2, two light beam spread angle regulating sheets 930 may be disposed on the lateral surfaces of the two opposing incident light portions of the light guiding plate 920. Each of the two light beam spread angle regulating sheets 930 may be disposed between a corresponding light source module 910 and the light guiding plate 920. In one exemplary embodiment, for example, each of the two light beam spread angle regulating sheets 930 may be attached to a corresponding lateral surface of the two opposing incident light portions of the light guiding plate 920.

Referring to FIG. 3, an exemplary embodiment of the backlight unit for the display device may be disposed on a rear surface of the display panel 300 to provide light to the display panel 300.

The display panel 300 may include a plurality of pixels PX for displaying an image, and a panel driver (not shown) for applying a plurality of driving signals to the pixels PX. The panel driver includes a gate driver, a data driver, and the like. In one exemplary embodiment, for example, the driver may be directly mounted on the display panel 300 in a form of integrated circuit ("IC") chip, may be mounted on a flexible printed circuit film to be attached to the display panel 300 in a tape carrier package ("TCP") form, or may be mounted on a separate printed circuit board.

As shown in FIG. 3, when a first direction D1 is defined by a horizontal direction or left and right directions from a viewpoint of a viewer seeing the display panel 300, the light source module 910 of the backlight unit disposed on the rear surface of the display panel 300 may be disposed along the lateral surface extending substantially parallel to the first direction D1 among the lateral surfaces of the light guiding plate 920. In an exemplary embodiment, e.g., the exemplary embodiment shown in FIG. 1, the light source module 910 may be disposed along a lower surface S1 or an upper surface S2 extending substantially parallel to the first direction D1 among the lateral surfaces of the light guiding plate 920. In an alternative exemplary embodiment, e.g., the exemplary embodiment shown in FIG. 2, the light source module 910 may be disposed along both of the lower surface S1 and the upper surface S2 of the light guiding plate 920. Accordingly, in such an embodiment, light is emitted at the light beam spread angle regulated through the light beam spread angle regulating sheet 930 through the light guiding plate 920 to the display panel 300, and a viewing angle in the horizontal direction or left and right directions from the viewpoint of the viewer is thereby effectively regulated.

Then, an exemplary embodiment of the light beam spread angle regulating sheet 930 according to the invention will be described in greater detail with reference to FIG. 4.

Figure 4:
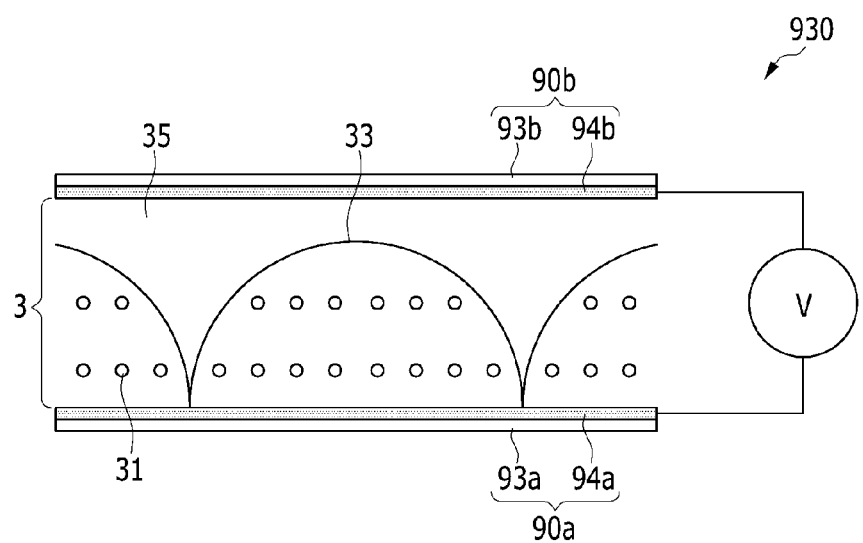
FIG. 4 is a cross-sectional view of an exemplary embodiment of a light beam spread angle regulating sheet included in the backlight unit for the display device according to the invention.

FIG. 4 is a cross-sectional view of an exemplary embodiment of a light beam spread angle regulating sheet included in the backlight unit for the display device according to the invention.

Referring to FIG. 4, an exemplary embodiment of the light beam spread angle regulating sheet 930 according to the invention includes a lenticular liquid crystal lens sheet. The light beam spread angle regulating sheet 930 as the lenticular liquid crystal lens sheet includes a lower plate 90a and an upper plate 90b opposite to the lower plate 90a, and a lens layer 3 disposed between the lower and upper plate 90a and 90b. In such an embodiment, the lower plate 90a may face the light source module 910 described above, and the upper plate 90b may face the light guiding plate 920.

The lower plate 90a may include a lower transparent substrate 93a and a lower transparent electrode 94a disposed on the lower transparent substrate 93a, and the upper plate 90b may include an upper transparent substrate 93b and an upper transparent electrode 94b disposed on the upper transparent substrate 93b.

The lower transparent substrate 93a and the upper transparent substrate 93b may include transparent glass having substantially high light transmittance and the like, and the lower transparent substrate 93a and the upper transparent substrate 93b are disposed opposite to and spaced apart from each other with a predetermined interval.

The lower transparent electrode 94a and the upper transparent electrode 94b may include a transparent conductive material such as indium tin oxide ("ITO") and indium zinc oxide ("IZO"). Each of the lower transparent electrode 94a and the upper transparent electrode 94b may receive a voltage.

The lens layer 3 includes a lenticular pattern layer 35 having a surface on which a plurality of optical patterns 33 is defined, and a liquid crystal layer disposed in each optical pattern 33 of the lenticular pattern layer 35 and including a plurality of liquid crystal molecules 31. In such an embodiment, the optical patterns 33 may be substantially the same as each other.

Each of the optical patterns 33 included in the lenticular pattern layer 35 may have substantially the same shape as the concave lens. In such an embodiment, each of the optical patterns 33 may have substantially an apparent surface of a hemisphere. The optical patterns 33 may be disposed to be adjacent to each other. The lenticular pattern layer 35 may include an insulating material such as a transparent polymer, for example. The lenticular pattern layer 35 may have a first refractive index n1, and the first refractive index n1 may have a value greater than 1. In one exemplary embodiment, for example, the first refractive index n1 may be in a range of about 1.2 to about 1.8.

The liquid crystal molecules 31 may fill an inner space confined by the concave surface of each optical pattern 33 of the lenticular pattern layer 35 and the lower transparent substrate 93a facing the concave surface. The liquid crystal molecules 31 may have dielectric anisotropy. The liquid crystal layer may have a second refractive index n2, and the second refractive index n2 may have a value larger than 1. In one exemplary embodiment, for example, the second refractive index n2 may be in a range of about 1.2 to about 1.8. In an exemplary embodiment, the second refractive index n2 of the liquid crystal layer may be changed based on an alignment direction of the liquid crystal molecule 31.

An alignment layer (not shown) for aligning the liquid crystal molecules 31 may be provided on at least one of the optical pattern 33 of the lenticular pattern layer 35 and the lower transparent electrode 94a.

The liquid crystal molecules 31 may be aligned such that longitudinal axes thereof are substantially vertical or horizontal to the surface of the lower transparent substrate 93a or the upper transparent substrate 93b based on a kind of alignment layer in a state where no electric field is generated in the inner space of the optical pattern 33. When the electric field is generated in the inner space of the optical pattern 33, alignment of the liquid crystal molecules 31 may change based on the generated electric field, thus changing the second refractive index n2 of the liquid crystal layer.

Accordingly, a difference between the second refractive index n2 and the first refractive index n1 of the liquid crystal layer when the electric field is generated in the inner space of the optical pattern 33 may be different from a difference between the second refractive index n2 and the first refractive index n1 of the liquid crystal layer when the electric field is not generated in the inner space of the optical pattern 33. In such an embodiment, the difference between the second refractive index n2 and the first refractive index n1 of the liquid crystal layer when the electric field is not generated in the inner space of the optical pattern 33 may be greater than the difference between the second refractive index n2 and the first refractive index n1 of the liquid crystal layer when the electric field is generated in the inner space of the optical pattern 33. In such an embodiment, a difference between the second refractive index n2 of the liquid crystal layer and a refractive index of air when the electric field is not generated in the inner space of the optical pattern 33 may be greater than a difference between the second refractive index n2 of the liquid crystal layer and the refractive index of air when the electric field is generated in the inner space of the optical pattern 33.

In an exemplary embodiment, the second refractive index n2 and the first refractive index n1 of the liquid crystal layer when the electric field is generated in the inner space of the optical pattern 33 may be substantially the same as or similar to each other (e.g., about 1.5), and the second refractive index n2 of the liquid crystal layer when the electric field is not generated in the inner space of the optical pattern 33 (e.g., about 1.7) may be greater than the first refractive index n1 (e.g., about 1.5). When the second refractive index n2 of the liquid crystal layer is greater than the first refractive index n1 of the lenticular pattern layer 35, the liquid crystal layer in a plurality of inner spaces may function as a convex lens. In such an embodiment, when the second refractive index n2 of the liquid crystal layer is greater than the first refractive index n1 of the lenticular pattern layer 35, a difference between the second refractive index n2 and the refractive index of air is increased.

The electric field in the inner space of the optical pattern 33 may be generated by applying different voltages to the lower transparent electrode 94a and the upper transparent electrode 94b.

According to an alternative exemplary embodiment of the invention, positions of the lenticular pattern layer 35 and the liquid crystal layer shown in FIG. 4 may be changed. In such an embodiment, the liquid crystal layer may be disposed on an upper plate 90b facing the light guiding plate 920, and the lenticular pattern layer 35 may be disposed on a lower plate 90a facing the light source module 910. In such an embodiment, the lenticular pattern layer 35 may have an opposite form to the shown optical pattern 33. In one exemplary embodiment, for example, the optical pattern 33 may have a convex lens form that is convex toward the upper plate 90b. In an exemplary embodiment, the liquid crystal layer may not be limited by the inner spaces shown in FIG. 4, but may fill a space other than the lenticular pattern layer 35 among the spaces of the lens layer 3.

An exemplary embodiment of a method of regulating a light beam spread angle based on an operation of the light beam spread angle regulating sheet 930 as the lenticular liquid crystal lens sheet will be described with reference to FIGS. 5 to 8 together with FIGS. 1 to 4. Hereinafter, for convenience of description, a method of regulating a light beam spread angle based on an operation of the exemplary embodiment of the light beam spread angle regulating sheet 930 shown in FIG. 4 will be described.

Figure 5:
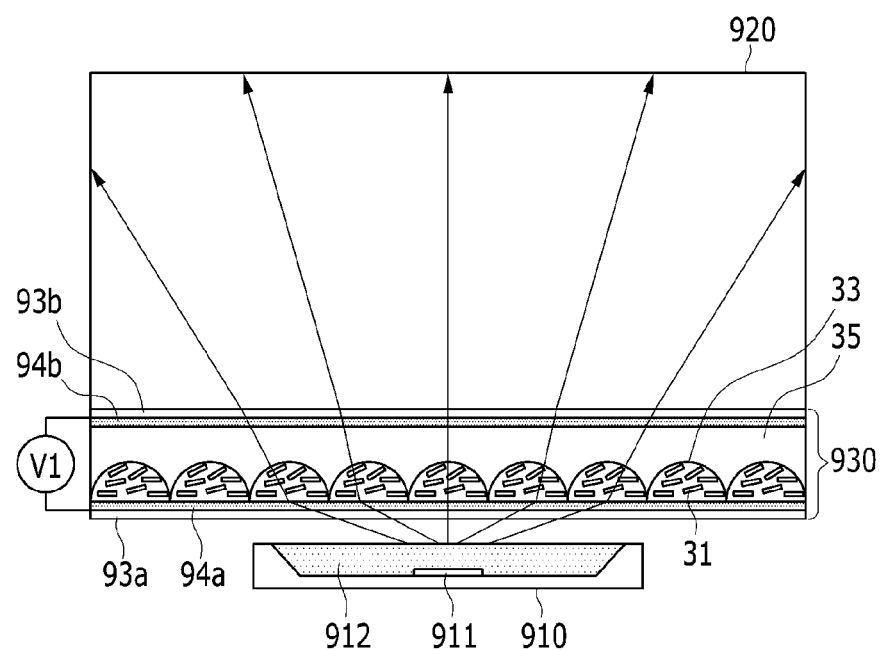
FIG. 5 is a block diagram showing light emitted at a small spread angle in an exemplary embodiment of the light beam spread angle regulating sheet of the backlight unit for the display device according to the invention.
Figure 6:
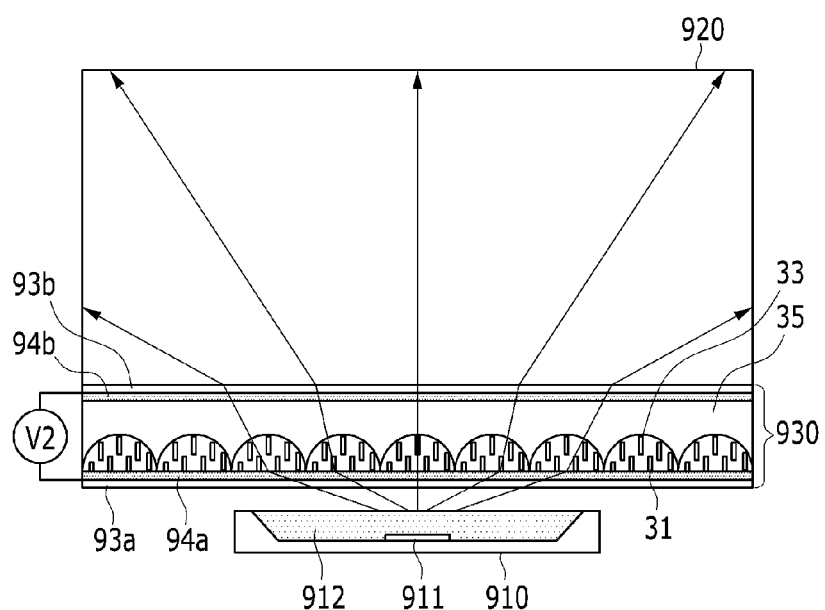
FIG. 6 is a block diagram showing light emitted at a large spread angle in an exemplary embodiment of the light beam spread angle regulating sheet of the backlight unit for the display device according to the invention.
Figure 7:
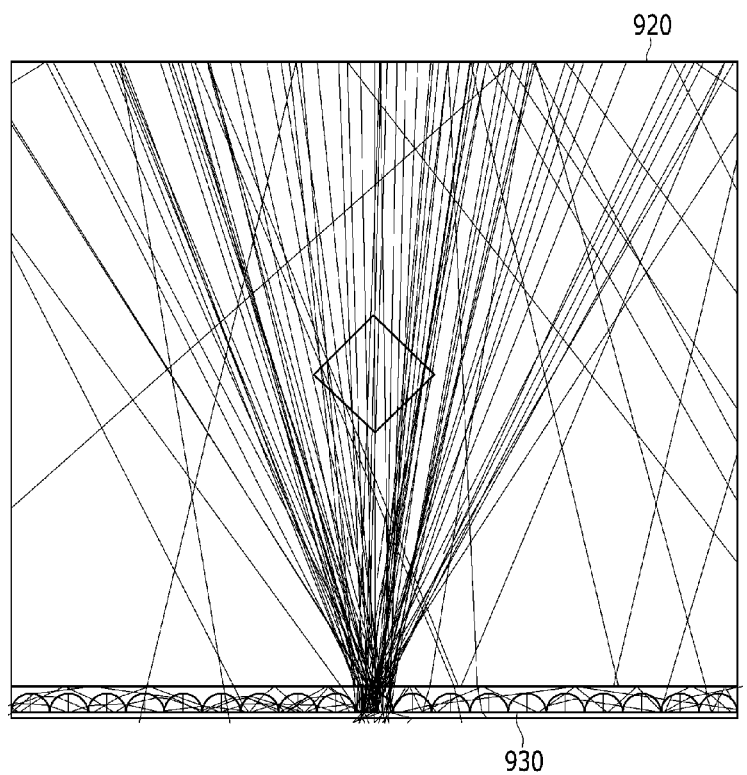
FIGS. 7 and 8 are schematic diagrams showing simulation of light emitted to an exemplary embodiment of a light guiding plate of the backlight unit for the display device according to the invention.
Figure 8:
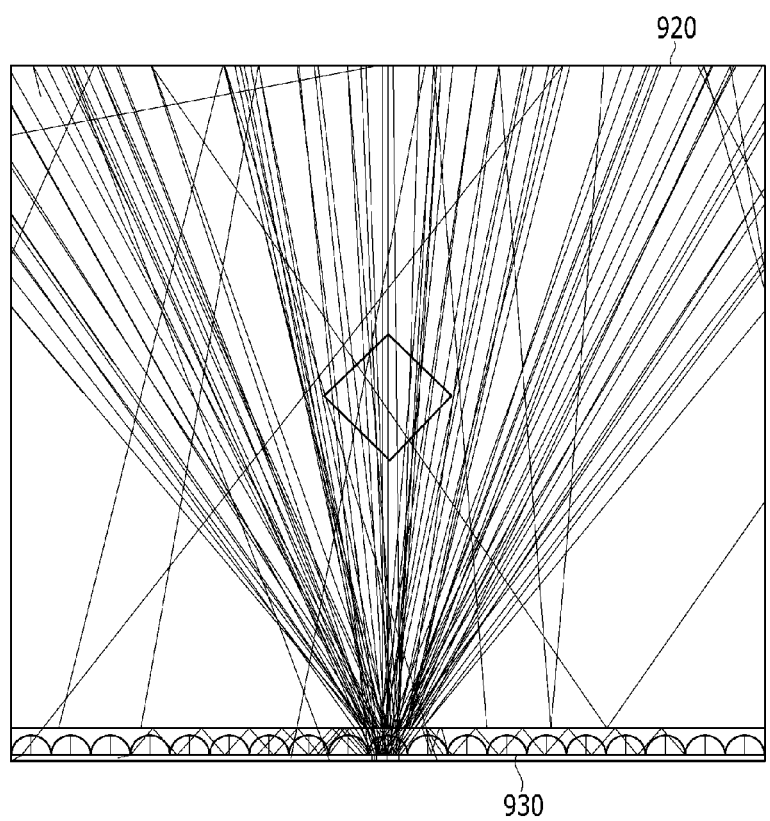

FIG. 5 is a block diagram showing light emitted at a small spread angle in an exemplary embodiment of the light beam spread angle regulating sheet of the backlight unit for the display device according to the invention, FIG. 6 is a block diagram showing light emitted at a large spread angle in an exemplary embodiment of the light beam spread angle regulating sheet of the backlight unit for the display device according to the invention, and FIGS. 7 and 8 are schematic diagrams showing simulation of light emitted to an exemplary embodiment of a light guiding plate of the backlight unit for the display device according to the invention.

First, referring to FIG. 5, an exemplary embodiment of the light source module 910 according to the invention may include a light emitting element 911 that emits light, and a buffer layer 912 covering the light emitting element 911. The buffer layer 912 may include a fluorescent body.

Referring to FIG. 5, when a first potential difference V1 is applied between the lower transparent electrode 94a and the upper transparent electrode 94b of the light beam spread angle regulating sheet 930, the second refractive index n2 of the liquid crystal layer may be greater than peripheral refractive indexes, such as the first refractive index n1 of the lenticular pattern layer 35, and the refractive index of air between the light source module 910 and the light beam spread angle regulating sheet 930. In such an embodiment, the first potential difference V1 may be approximately zero (0) volt (V). Then, the liquid crystal layer may function as the convex lens having a greater refractive index than the periphery to refract light that is incident on the light beam spread angle regulating sheet 930 from the light source module 910 to be concentrated on the center, and thus the light beam spread angle may be reduced to allow light to be incident on the light guiding plate 920. When the light beam spread angle of light emitted from the light guiding plate 920 is relatively reduced, an image having the small viewing angle may be displayed by the display panel 300.

Next, referring to FIG. 6, when a second potential difference V2, which is different from the first potential difference V1, is applied between the lower transparent electrode 94a and the upper transparent electrode 94b of the light beam spread angle regulating sheet 930, the second refractive index n2 of the liquid crystal layer is reduced as compared to the case when the first potential difference V1 is applied as shown in FIG. 5. In such an embodiment, the second refractive index n2 of the liquid crystal layer may be substantially similar to or the same as the first refractive index n1 of the lenticular pattern layer 35, and a difference with the refractive index of air between the light source module 910 and the light beam spread angle regulating sheet 930 is thereby reduced. In such an embodiment, the second potential difference V2 may be a voltage greater than zero (0) V. When the second potential difference V2 is applied between the lower transparent electrode 94a and the upper transparent electrode 94b of the light beam spread angle regulating sheet 930, the liquid crystal layer as the convex lens less functions as compared to the case of FIG. 5, and thus light that is incident on the light beam spread angle regulating sheet 930 from the light source module 910 may not be substantially refracted to the center as compared to the case when the first potential difference V1 is applied as shown in FIG. 5, but may be incident on the light guiding plate 920 at a relatively large light beam spread angle. When the light beam spread angle of light emitted from the light guiding plate 920 is relatively increased, an image having the large viewing angle may be displayed by the display panel 300. In such an embodiment, when light emitted from the light guiding plate 920 may have a light beam spread angle that is similar to the case where no light beam spread angle regulating sheet 930 is provided therein, an image having a relatively large viewing angle may be displayed by the display panel 300.

When the second potential difference V2 is applied between the lower transparent electrode 94a and the upper transparent electrode 94b in the exemplary embodiment of FIG. 6, the second refractive index n2 of the liquid crystal layer may be less than the first refractive index n1 of the lenticular pattern layer 35. In such an embodiment, the light beam spread angle of light emitted from the light source module 910 may be larger than that of the case shown in FIG. 5.

FIG. 7 shows simulation of light emitted to the light guiding plate of the backlight unit when the first potential difference V1 is applied between the lower transparent electrode 94a and the upper transparent electrode 94b of the light beam spread angle regulating sheet 930 as shown in FIG. 5, and FIG. 8 shows simulation of light emitted to the light guiding plate of the backlight unit when the second potential difference V2 is applied between the lower transparent electrode 94a and the upper transparent electrode 94b of the light beam spread angle regulating sheet 930 as shown in FIG. 6. As shown in FIGS. 7 and 8, the light beam spread angle of light that is incident on the light guiding plate 920 may be substantially changed based on the potential difference applied between the lower transparent electrode 94a and the upper transparent electrode 94b of the light beam spread angle regulating sheet 930.

As described above, in an exemplary embodiment, the light beam spread angle regulating sheet 930 may be disposed on an incident light portion of the light guiding plate 920, and the light beam spread angle of light emitted from the light source module 910 may be regulated by controlling the voltages applied to, or the potential difference in, the light beam spread angle regulating sheet 930 to allow light to be incident on the light guiding plate 920, and thus the viewing angle of the image displayed by the display panel 300 may be regulated. Accordingly, in such an embodiment, the image displayed by the display panel 300 is effectively prevented from being seen at a lateral surface thereof. According to an exemplary embodiment of the invention, as a separate pattern for regulating the light beam spread angle is not formed on the incident light portion of the light guiding plate 920, a light blocking portion for covering a portion corresponding to the separate pattern in the display device is not provided, and the width of the peripheral region of the display device is thereby substantially reduced.

In an exemplary embodiment, where the light beam spread angle regulating sheet 930 has a predetermined form and thickness according to the position, the light beam spread angle regulating sheet 930 may be designed without being limited by disposal and sizes of the light source module 910.

Next, the structure of an exemplary embodiment of the backlight unit for the display device according to the invention will be described with reference to FIGS. 9 and 10.

Figure 9:
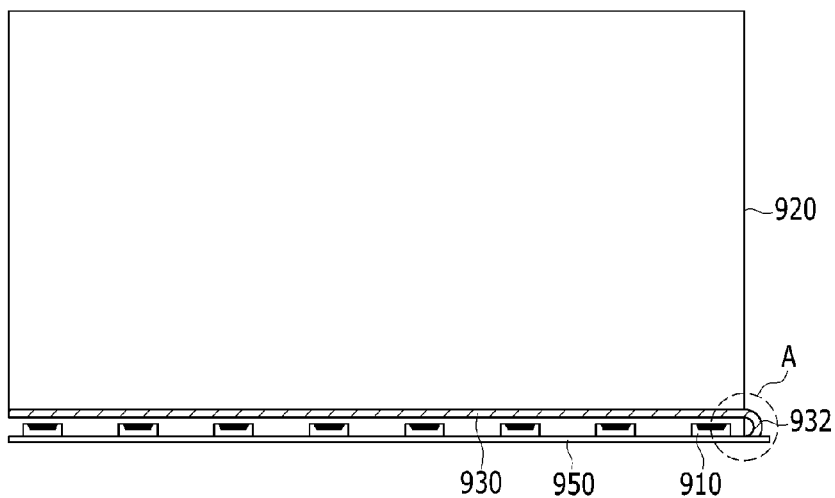
FIG. 9 is a block diagram showing another alternative exemplary embodiment of the backlight unit for the display device according to the invention.
Figure 10:
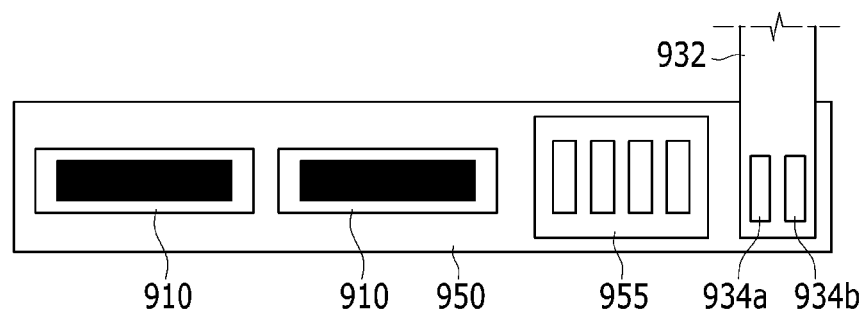
FIG. 10 is a block diagram showing an exemplary embodiment of a printed circuit board ("PCB") of a light source module of the backlight unit for the display device according to the invention.

FIG. 9 is a block diagram showing an alternative exemplary embodiment of the backlight unit for the display device according to the invention, and FIG. 10 is a block diagram showing an exemplary embodiment of a printed circuit board ("PCB") of a light source module of the backlight unit for the display device according to the invention.

The backlight unit for the display device of FIG. 9 is substantially the same as the exemplary embodiments of the backlight unit described above, and FIG. 9 shows an exemplary embodiment where a plurality of light source modules 910 is attached to the PCB 950.

Referring to FIGS. 9 and 10, the light beam spread angle regulating sheet 930 may be connected through a connection wire 932 to the PCB 950. The light beam spread angle regulating sheet 930 may receive a voltage applied through the connection wire 932 from the PCB 950 to the lower transparent electrode 94a and the upper transparent electrode 94b.

The PCB 950 may include a first pad 934a and a second pad 934b connected to the connection wire 932. The first pad 934a may transfer a first voltage applied to the lower transparent electrode 94a of the light beam spread angle regulating sheet 930 to the connection wire 932, and the second pad 934b may transfer a second voltage applied to the upper transparent electrode 94b of the light beam spread angle regulating sheet 930 to the connection wire 932.

The PCB 950 may further include a driver of the light beam spread angle regulating sheet 930 and a connector 955 that connects the first pad 934a and the second pad 934b.

According to another alternative exemplary embodiment of the invention, the light beam spread angle regulating sheet 930 may receive the voltage from the PCB, on which the panel driver, such as the data driver for applying the driving signal to the display panel 300, is mounted. In such an embodiment, the driver of the light beam spread angle regulating sheet 930 may be mounted on the PCB on which the panel driver is mounted.

Figure 11:
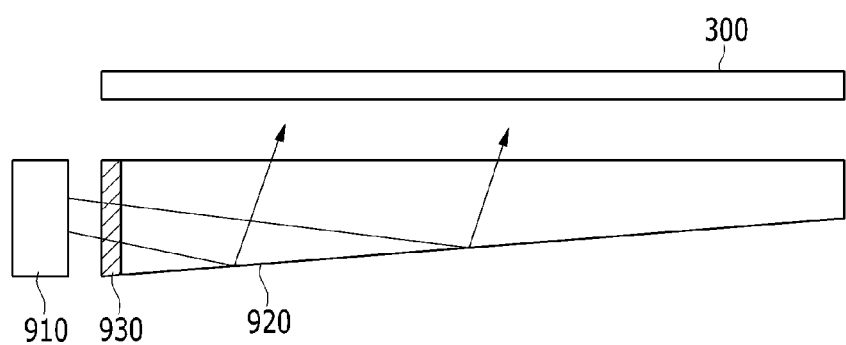
FIG. 11 is a cross sectional view of the light source module and the light guiding plate of an exemplary embodiment of the backlight unit for the display device according to the invention.

FIG. 11 is a cross-sectional view of the light source module and the light guiding plate of an exemplary embodiment of the backlight unit for the display device according to the invention.

Referring to FIG. 11, in an exemplary embodiment, the light guiding plate 920 included in the backlight unit for the display device may be a wedge type light guiding plate, where a rear surface, which is opposite to a front surface facing the display panel 300, includes an inclined surface. In such an embodiment, light emitted from the light source module 910 may be incident on the light guiding plate 920 through the light beam spread angle regulating sheet 930 while the light beam spread angle is regulated, and light progressing in the light guiding plate 920 may be reflected on the rear surface including the inclined surface of the light guiding plate 920 to be emitted toward the front surface on which the display panel 300 is disposed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight unit for a display device comprising:
   a light source module which emits light,
   a light guiding plate which guides the light incident from the light source module toward a front surface thereof, and a light beam spread angle regulating sheet disposed between the light source module and a lateral surface of the light guiding plate, wherein the light beam spread angle regulating sheet changes a light beam spread angle of the light incident from the light source module between at least two different spread angles at different times.

2. The backlight unit for the display device of claim 1, wherein
the light beam spread angle regulating sheet comprises:
a first transparent electrode;
a second transparent electrode disposed opposite to the first transparent electrode; and
a lens layer disposed between the first transparent electrode and the second transparent electrode.

3. The backlight unit for the display device of claim 2, wherein
the lens layer comprises:
a lenticular pattern layer having a plurality of optical patterns and a first refractive index, and
a liquid crystal layer comprising a plurality of liquid crystal molecules and having a second refractive index, which changes based on an alignment of the liquid crystal molecules.

4. The backlight unit for the display device of claim 3, wherein
the light incident on the light beam spread angle regulating sheet is emitted at a first light beam spread angle in a first state where a first potential difference is applied to the first transparent electrode and the second transparent electrode, and
the light incident on the light beam spread angle regulating sheet is emitted at a second light beam spread angle, which is greater than the first light beam spread angle, in a second state where a second potential difference, which is different from the first potential difference, is applied to the first transparent electrode and the second transparent electrode.

5. The backlight unit for the display device of claim 4, wherein
the second refractive index in the first state is greater than the second refractive index in the second state.

6. The backlight unit for the display device of claim 5, wherein
the second refractive index in the first state is greater than the first refractive index.

7. The backlight unit for the display device of claim 6, wherein
each of the optical patterns has a concave lens form, and
the liquid crystal molecules are disposed in a space confined by the optical pattern and the first transparent electrode.

8. The backlight unit for the display device of claim 7, further comprising:
a printed circuit board, on which the light source module is disposed,
wherein the light beam spread angle regulating sheet receives a voltage from the printed circuit board.

9. The backlight unit for the display device of claim 8, wherein
a bottom surface of the light guiding plate, which is opposite to a light emitting surface of the light guiding plate, includes an inclined surface.

10. The backlight unit for the display device of claim 9, wherein
the light beam spread angle regulating sheet is attached to two opposing lateral surfaces of the light guiding plate.

11. The backlight unit for the display device of claim 3, wherein
each of the optical patterns has a concave lens form, and
the liquid crystal molecules are disposed in a space confined by the optical pattern and the first transparent electrode.

12. The backlight unit for the display device of claim 1, further comprising:
a printed circuit board, on which the light source module is disposed,
wherein the light beam spread angle regulating sheet receives a voltage from the printed circuit board.

13. The backlight unit for the display device of claim 1, wherein
a bottom surface of the light guiding plate, which is opposite to a light emitting surface of the light guiding plate, includes an inclined surface.

14. The backlight unit for the display device of claim 1, wherein
the light beam spread angle regulating sheet is attached to two opposing lateral surfaces of the light guiding plate.

15. A driving method of a backlight unit for a display device, the method comprising:
providing light from a light source module of the backlight unit to be incident on a light beam spread angle regulating sheet of the backlight unit,
applying a first potential difference to the light beam spread angle regulating sheet to set a light beam spread angle of the light incident on the light beam spread angle regulating sheet as a first spread angle,
applying a second potential difference, which is different from the first potential difference, to the light beam spread angle regulating sheet to set the light beam spread angle of the light incident on the light beam spread angle regulating sheet as a second spread angle, which is different from the first spread angle, and
providing the light emitted from the light beam spread angle regulating sheet to be incident on a light guiding plate of the backlight unit.

16. The driving method of claim 15, wherein
the light beam spread angle regulating sheet comprises:
a first transparent electrode;
a second transparent electrode disposed opposite to the first transparent electrode; and
a lens layer disposed between the first transparent electrode and the second transparent electrode.

17. The driving method of claim 16, wherein
the lens layer comprises:
a lenticular pattern layer having a plurality of optical patterns and a first refractive index, and
a liquid crystal layer including a plurality of liquid crystal molecules and having a second refractive index, which changes based on an alignment of the liquid crystal molecules.

18. The driving method of claim 17, wherein
the second refractive index when the second potential difference is applied to the light beam spread angle regulating sheet is less than the second refractive index when the first potential difference is applied to the light beam spread angle regulating sheet.

19. The driving method of claim 18, wherein
the second refractive index when the first potential difference is applied to the light beam spread angle regulating sheet is greater than the first refractive index.

20. The driving method of claim 19, wherein
each of the applying the first potential difference to the light beam spread angle regulating sheet and the applying the second potential difference to the light beam spread angle regulating sheet comprises receiving a voltage from a printed circuit board on which the light source module of the backlight unit is disposed.

* * * * *